July 18, 1944. J. S. PARSONS 2,354,138
ELECTRICAL DISTRIBUTION SYSTEM
Filed June 10, 1942 4 Sheets-Sheet 1
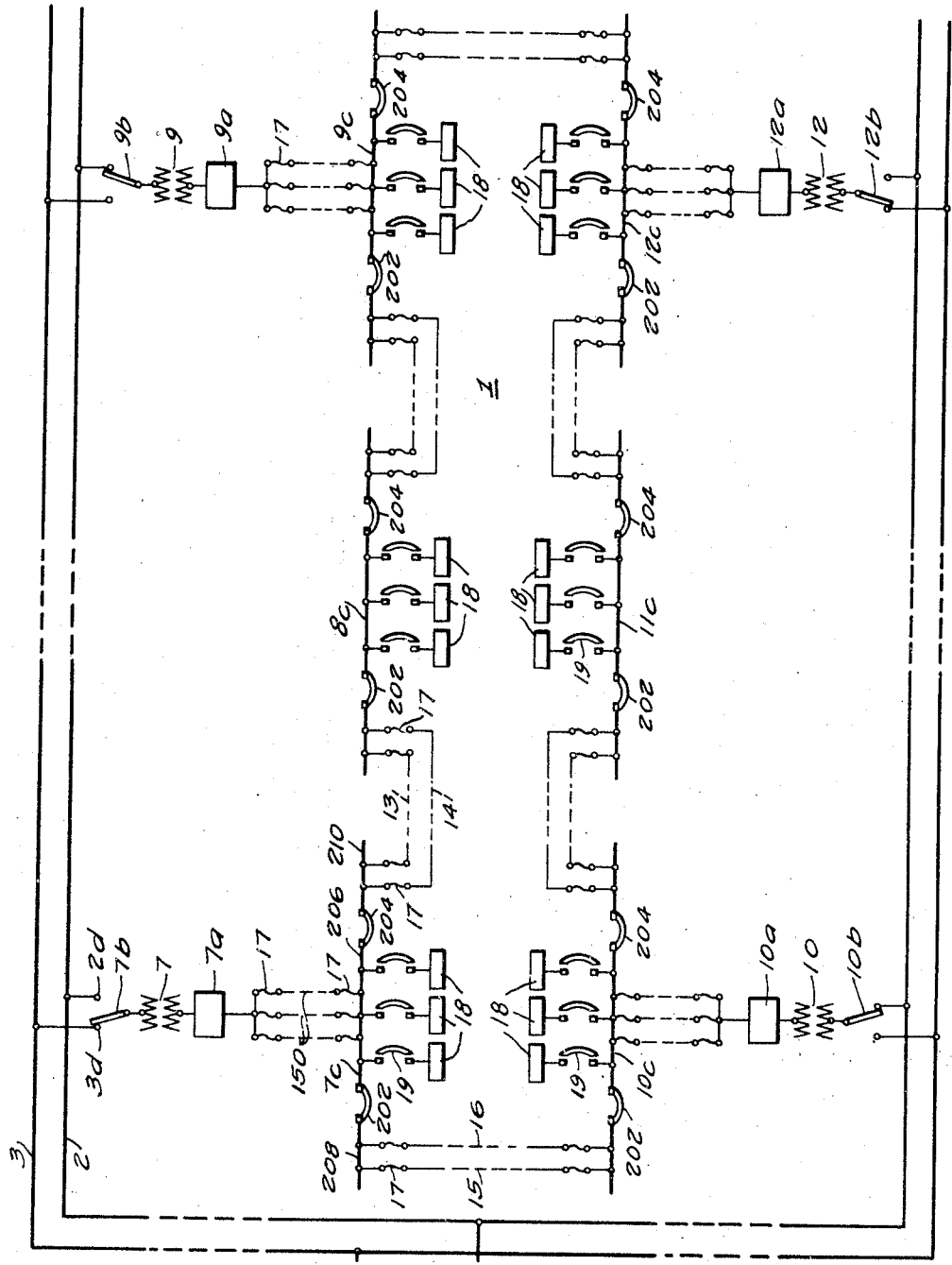
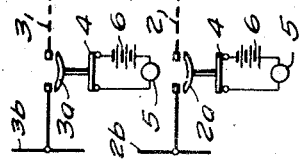
WITNESSES:
INVENTOR
John S. Parsons.
BY
ATTORNEY

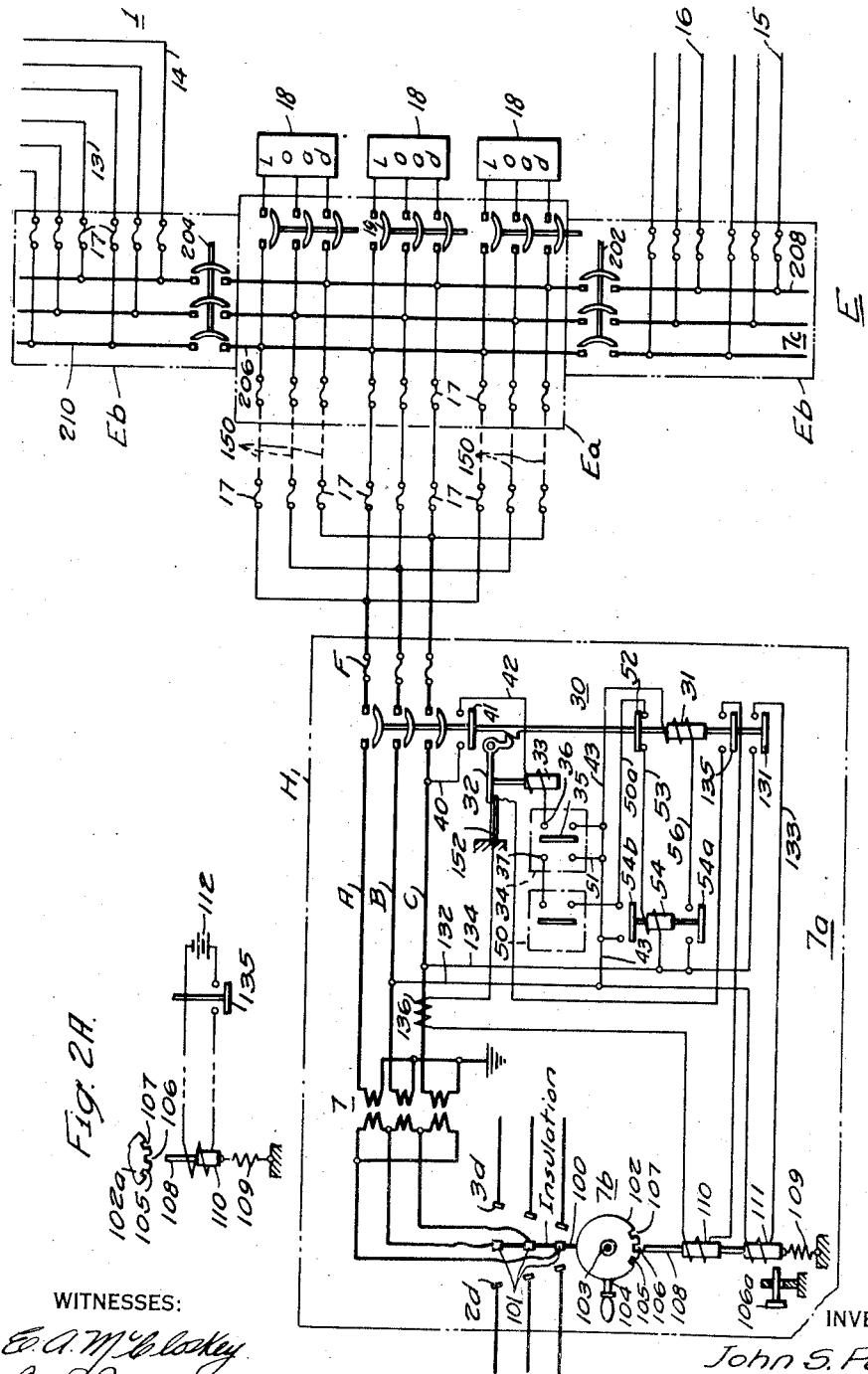

Patented July 18, 1944

2,354,138

UNITED STATES PATENT OFFICE 2,354,138

ELECTRICAL DISTRIBUTION SYSTEM

John S. Parsons, Wilkinsburg, Pa., assignor to Westinghouse Electric & Manufacturing Company, East Pittsburgh, Pa., a corporation of Pennsylvania Application June 10, 1942, Serial No. 446,447

23 Claims. (Cl. 171—97)

This invention relates to electrical distribution systems, and it has particular relation to network distribution systems wherein a common network circuit or grid is supplied with electrical energy from a plurality of feeder circuits.

Network circuits are widely employed for supplying electrical energy to areas having high load densities such as urban areas. Such network systems may take the form of primary network systems or secondary network systems, examples of which are shown in my Patents Nos. 1,997,597 and 1,955,311.

As generally designed, a network system includes a network circuit or grid which is supplied with electrical energy from a plurality of feeder circuits. Each feeder circuit generally is connected to the network circuit or grid through a plurality of transformers, which may be termed "network transformers," each is provided with a circuit breaker or "network protector" for controlling the connections between the network transformers and the network circuit. When a fault occurs on one of the feeder circuits, the faulty feeder circuit, together with the network transformers associated therewith, are removed from service. The network circuit or grid in this case continues to receive electrical energy from the network transformers associated with the remaining feeder circuit or feeder circuits. A characteristic of this system is that substantially no interruption in continuity of service results from the withdrawal of a faulty feeder circuit from service.

As pointed out in my copending application Serial No. 418,729, filed November 12, 1941 (now Patent 2,300,465, issued November 3, 1942), it is possible to eliminate a substantial amount of spare transformer capacity by providing each network transformer with a double-throw switch for connecting each network transformer to either of a pair of feeder circuits. When one of the feeder circuits is removed from service, the network transformers normally associated with such feeder circuit may be connected to the remaining feeder circuit. Since a transformer may be operated at a very substantial overload for a short time, such as from thirty minutes to one hour, without harm, the network transformers normally associated with the feeder circuit or circuits remaining in service are able to carry the entire network circuit or grid load until the network transformers associated with the feeder-circuit-removed-from-service are connected to a remaining feeder circuit. With such a system, all network transformers are available for service at all times. For this reason, substantially no reserve or spare transformer capacity is required. Preferably, each double-throw switch is designed for operation only when the switch carries substantially less than its normal rated load current.

As pointed out in my aforesaid application, the network circuit or grid may take the form of a loop circuit. This loop circuit is formed of a plurality of load buses, each pair of which is connected by a plurality of connecting circuits.

In the network or distribution system thus far described, it should be observed that when a fault occurs on one of the feeder circuits, the transformers associated with the remaining feeder circuit or circuits are substantially overloaded until the double-throw switches associated with the primary windings of the transformers connected to the faulty feeder circuit are operated. Consequently, care must be exercised to operate these switches before the transformers remaining in service continuously are damaged.

It should be observed further that if a feeder circuit is removed from service because of a faulty network transformer, operation of the double-throw switch associated with the faulty transformer connects the transformer to a second feeder circuit which consequently is also removed from service. This may result in the loss of a substantial part, or all, of the network load.

In prior art network systems, it is customary for faulty conductors in the network circuit or grid to be repaired while the network circuit is energized. Such repairs may be effected by experienced servicemen without danger. Repairs are effected while the network circuit is energized in order to avoid the loss of load during the period required for the repair operations.

In accordance with the invention, transformers employed in network systems of the type thus far described are provided with protective devices which are responsive to the load capacity of the associated transformers. If an attendant fails to operate the double-throw switches for transferring network transformers associated with a faulty feeder circuit to a sound feeder circuit, the network transformers remaining in service attempt to carry the entire system load. If one of the latter network transformers carries an excessive load for a time such that further operation thereof will damage the transformer, the protective device associated therewith operates to remove the network transformer from service.

In accordance with a further aspect of the invention, the operation of the network system may be improved by the adoption of network protectors designed for insensitive operation. Insensitive network protectors may be designed to trip with substantial time delay for current reversals therethrough of small magnitude and to trip relatively promptly for current reversals therethrough of larger magnitude. Such network protectors not only eliminate undesirable responses to synchronizing and circulating currents, but also permit the adoption of an improved switching sequence.

As previously explained, the switching of a faulty network transformer from a first to a second feeder circuit may result in the removal of both feeder circuits from service. In accordance with the improved switching sequence, when a feeder circuit is removed from service, the following sequence is followed in transferring each of the network transformers associated therewith to a second feeder circuit. The double-throw switch associated with a network transformer is first placed in a neutral position. Next, the network protector associated with the transformer is closed. If the network transformer is faulty, the network protector promptly trips out. This indicates that the fault is in the network transformer rather than in the feeder circuit normally associated therewith. Consequently, the network transformer may be removed for repairs, and the remaining network transformers may be restored to their normal operating connections.

Should the network protector when closed remain closed for a substantial time, the associated network transformer is in sound condition and may be transferred to the second feeder circuit. This procedure is followed for each network transformer until the faulty network transformer is found or until it is established that the fault is on the associated feeder circuit.

In some cases substantial savings in the current carrying capacities of secondary connecting circuits is effected by arranging the transformers in groups of two or more, each group being connected to a common point on the secondary circuit.

The invention also contemplates the association of a pair of load break switches with each of the load buses in a network circuit. Each pair of load break switches divide the associated load bus into a load section and a pair of terminal sections. The connecting circuits between each pair of load buses are connected to one terminal section on each of the buses. Connections for supplying power directly to the load bus and for supplying power from the load bus to the load preferably are connected to the load section of the load bus. By operation of two load break switches, all connecting circuits between any pair of load buses may be deenergized for servicing without interference from the remainder of the distribution system. Also the load section of a load bus may be deenergized by opening the associated load break switches and the associated network protector.

It is, therefore, an object of the invention to provide an electrical distribution system wherein transformers have a double-throw switch for connecting each transformer to either of a pair of sources of energy, with means responsive to the load capacity of each transformer for removing the associated transformer from service.

It is a further object of the invention to provide an electrical system of distribution wherein transformers are provided with double-throw switches for connecting each transformer to either of a pair of sources of electrical energy, with insensitive means for disconnecting each of the transformers from an associated load circuit.

It is another object of the invention to provide an improved method for switching transformers associated with a common load circuit from one source of energy to another source of energy.

It is still another object of the invention to provide an electrical distribution system wherein a loop circuit is employed having load buses connected by a plurality of connecting circuits, with load break switches in the buses for removing the associated connecting circuits from service.

It is an additional object of the invention to provide a secondary network system wherein network transformers are arranged in groups of two or more, the transformers of each group being connected to a substantially common point on the secondary circuit of the network system.

Other objects of the invention will be apparent from the following description taken in conjunction with the accompanying drawings, in which:

Figure 1 is a schematic view in single line of an electrical distribution system embodying the invention;

Fig. 2 is a schematic view showing in greater detail a portion of the system illustrated in Fig. 1;

Fig. 2A is a schematic view showing a modification of a portion of the system of Fig. 2;

Figure 3:
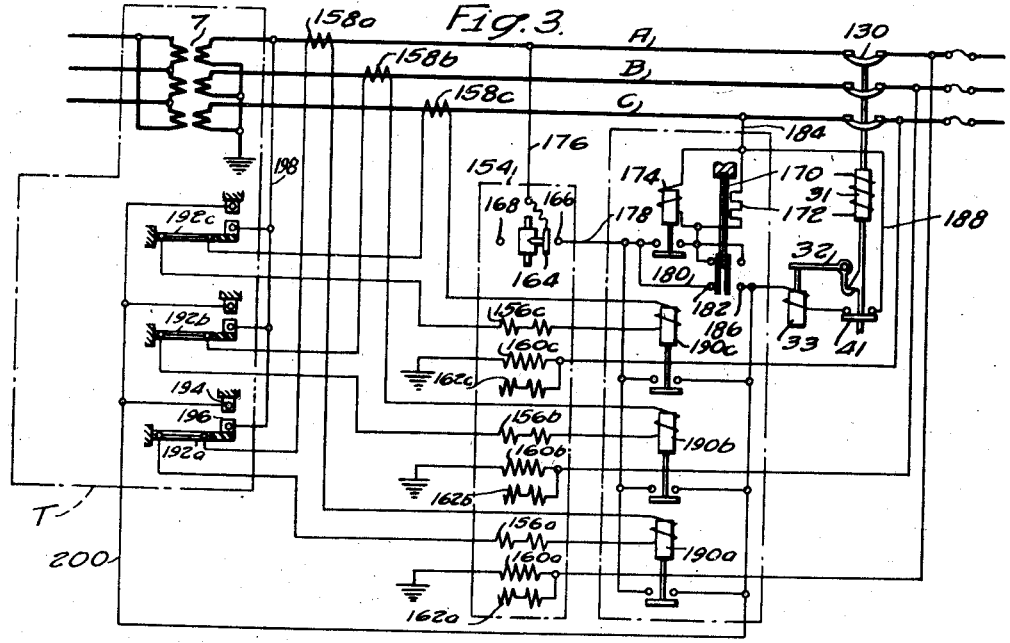
Fig. 3 is a schematic view showing a modification of a portion of the system illustrated in Fig. 2.

Referring to the drawings, Fig. 1 shows an electrical distribution circuit including a secondary network circuit or grid 1 which is energized from a plurality of feeder circuits 2 and 3. This system may be designed for single-phase or polyphase operation. For purposes of illustration, it is assumed that the system of Fig. 1 is a three-phase alternating-current system operating at a frequency of 60 cycles per second. Portions of certain circuits are shown dotted to indicate that the circuits may have substantial lengths.

Each of the feeder circuits 2 and 3 is provided with a feeder circuit breaker 2a or 3a for controlling the connection of the associated feeder circuit to a suitable source of energy. Each of the feeder circuit breakers is designed to trip automatically in response to the condition of the associated feeder circuit when a fault occurs thereon. If the distribution system is of small extent, such as a system designed for a small factory, each of the feeder circuit breakers may be of the manual reclosing type.

If the distribution system is such that a fault occurring on the feeder circuit in certain cases may be self-clearing, each of the feeder circuit breakers preferably is of an automatic reclosing type. As an example of a suitable reclosing circuit breaker, such a breaker may reclose automatically three times at different time intervals if tripped in response to a persistent fault. If a fault responsible for a tripping of the feeder circuit breaker fails to clear within the reclosing cycle thereof, the feeder circuit breaker then locks out in its open condition. Circuit breakers of this type are well known in the art.

Opening of a feeder circuit breaker may be indicated by a suitable signal device. For example, each feeder circuit breaker may be provided with back contacts 4 for closing a local circuit including a signal device 5 and a source of energy such as a battery 6. The signal device 5 may be in the form of an electric bell or lamp.

A suitable source of energy for the feeder circuits 2 and 3 is represented in Fig. 1 by buses 2b and 3b. These buses may represent portions of a common bus structure or may represent completely independent sources of energy. If the voltage of the buses is equal to that desired for the feeder circuits 2 and 3, the feeder circuit may be connected directly thereto through the feeder circuit breakers.

Connection of the network circuit or grid 1 to the feeder circuits is effected through a plurality of network transformers 7, 9, 10 and 12. In Fig. 1, the primary windings of the network transformers 7 and 12 are connected to the feeder circuit 3. The primary windings of the remaining transformers are connected to the feeder circuit 2. For controlling the connections of the network transformers to the network circuit or grid 1, a network protector 7a, 9a, 10a or 12a is interposed between the secondary winding of each network transformer and the network circuit or grid. The network circuit or grid may operate at a relatively low voltage, such as a phase-to-phase voltage of 208 or 440 volts whereas the feeder circuits may operate at a higher voltage, such as 13,200 volts.

As well understood in the art, a network protector generally is designed to remain closed when a fault occurs on the network circuit or grid. However, when a fault occurs on the associated feeder circuit, electrical energy flows from the network circuit or grid to the fault through one or more network protectors. This reversal in the direction of energy flow through a network protector trips the network protector to disconnect the faulty feeder circuit from the network circuit or grid. In certain cases, it may be desirable to trip a network protector in response to excessive current flow therethrough to a network circuit or grid for appreciable periods of time. An example of a suitable network protector is described in greater detail in my Patent No. 2,082,024.

To eliminate the requirement for reserve or spare transformer capacity, the primary winding of each of the network transformers is provided with a switch 7b, 9b, 10b or 12b through which the associated network transformer may be selectively connected to either of the feeder circuits. For example, adjacent the switch 7b, the feeder circuits 2 and 3 are provided with contacts 2d and 3d which may be selectively engaged by the switch 7b. If desired, each of the switches may also include a neutral position wherein the switch is disconnected from both of the feeder circuits.

When switches are provided as indicated in the preceding paragraph, each of the feeder circuits serves as a normal energizing source for half of the network transformers and as an emergency energizing source for the remaining network transformers. Should a permanent fault occur on one of the feeder circuits, the network transformers normally associated with the faulty feeder circuit may be connected to the remaining feeder circuit. In this case, all network transformers would be connected to a single feeder circuit, and all would be available for supplying electrical energy to the network circuit or grid 1. For this reason, substantially no reserve or spare transformer capacity is required.

Conveniently, the operation of the switches 7b, 9b, 10b and 12b may be entirely manually controlled. Such control is entirely adequate for small distribution systems. If desired, however, the movement of each switch from its normal connection to its emergency connection may be automatic, as in response to loss of voltage on its normal feeder circuit.

Generally, each transformer with its associated network protector and switch may be located adjacent each other. With such a positioning of the apparatus, a common enclosure H (Fig. 2) may be provided for each network transformer and its associated network protector and switch.

Although the network circuit or grid 1 may be of conventional construction, a novel construction is shown in Fig. 1, which, together with the switches 7b, 9b, 10b and 12b, contributes to optimum performance of the distribution system under all conditions of operation.

The network circuit or grid 1 includes load buses 7c, 8c, 9c, 10c, 11c and 12c. Each adjacent pair of load buses is connected by a plurality of connecting circuits. For example, the load buses 7c and 8c are connected by a pair of connecting circuits 13 and 14. As a further example, the load buses 7c and 10c are connected by a pair of connecting circuits 15 and 16. The load buses, together with the connecting circuits, form a solidly connected network circuit or grid. Each of the connecting circuits preferably is suitably segregated, as in a separate duct. With such segregation, a fault on one connecting circuit does not affect the remaining connecting circuit. For example, if the connecting circuits 13 and 14 are three-phase circuits, the three phase-conductors of each of these circuits (together with the associated neutral conductor if four-wire distribution is employed) are installed in a separate conduit.

The advantages derived from the provision of a plurality of connecting circuits may be shown by an example. Should a fault occur on one of the connecting circuits, such as the circuit 13, the resultant flow of current to the fault operates to burn clear the connecting circuit 13 from the remaining circuit or grid. However, since the associated connecting circuit 14 remains intact, the remaining circuit or grid is not opened at any point.

Moreover, the provision of a plurality of connecting circuits may actually save copper. For example, assume that the connecting circuits 13 and 14 are formed of conductor having a 212,000 circular mil cross-section (this corresponds to a 4/0 conductor). A pair of such conductors has a higher current capacity than a single conductor having a 500,000 circular mil cross-section. Therefore, the provision of a plurality of connecting circuits not only improves the operation of the distribution system, but it may result in a saving in copper. Such a system also provides improved regulation at low power factors.

Small distribution systems may not have sufficient available energy to burn clear faults occurring on the connecting circuits. For this reason, it may be desirable to provide limiters 17 at each end of a connecting circuit. A limiter may take the form of a heavy copper fuse or a weak link which opens with the customary fuse time delay when current above the normal rated capacity thereof passes therethrough. Such limiters assure the removal of a faulty connecting circuit from service.

As a general rule, the load buses 7c to 12c are relatively short compared to the connecting circuits. For this reason, it is generally possible to provide additional insulation for the load buses. Consequently, the possibility of a fault at a load bus may, generally, be ignored.

Although loads may be connected to the connecting circuits, preferably the loads are connected directly to the load buses 7c to 12c. For example, in Fig. 1, loads 18 are connected to the load buses 7c to 12c. If desired, each load may be connected to its associated load bus through an automatic circuit breaker 19. The load may represent any desirable electric load, such as electric lighting or electric motors. Preferably, the limiters 17 are completely enclosed. Conveniently, each load bus 7c, 8c, 9c, 10c, 11c or 12c and all of its adjacent limiters 17 may be enclosed in a suitable cabinet or enclosure E (Fig. 2) provided with terminals for receiving connecting circuits, load circuits and protector connections.

It is believed that operation of the distribution system shown in Fig. 1 is clear from the foregoing description. Under normal operating conditions, the network transformers 7 and 12 are connected to receive electric energy from the feeder circuit 3. The network transformers 9 and 10 are connected to receive electric energy from the feeder circuit 2. Consequently, all network transformers are in service to supply electric energy to the network circuit 1.

Should a fault occur at one of the loads 18, the circuit breaker 19 associated with the faulty load opens to disconnect the load from its associated load bus. Except for the faulty load, the distribution system continues in normal operation.

In the event that a fault occurs on one of the connecting circuits, such as the connecting circuit 13, excessive current flows to the connecting circuit from the rest of the network circuit or grid 1. This excessive current operates to "blow" the limiters 17 at each end of the connecting circuit 13. Since the associated connecting circuit 14 remains intact, the network circuit or grid 1 remains unbroken, and the system continues in operation except for the connecting circuit 13.

As previously pointed out, it is extremely unlikely that faults can occur on the load buses. For completeness, however, it is here assumed that a fault occurs on the load bus 7c. The resulting flow of current to the faulty load bus through the connecting circuits 13, 14, 15 and 16 results in the blowing of at least one current limiter in each of these connecting circuits. This effectively isolates the load bus 7c from direct connection with the remainder of the network circuit or grid 1.

The performance of the network protector 7a depends upon its construction. If it is designed to trip in response to excessive current flowing therethrough, it will open to isolate the load bus 7c from the feeder circuits. Such operation of the network protector removes the network transformer 7 from service and permits the remainder of the network circuit or grid 1 to continue in operation, receiving energy from the network transformers 9 to 12.

Assuming that the network protector 7a trips only in response to a reversal in the direction of energy flow therethrough, the fault on the load bus 7c will not result in an opening of the network protector 7a. In such a case, fuses generally provided in the network protector "blow" to remove the protector from service.

A fault occurring on one of the feeder circuits, such as the feeder circuit 3, results in a flow of electric energy from the network circuit or grid 1, through the network protectors 7a and 12a. The reversal in the direction of energy flow through these protectors opens the protectors to disconnect the associated network transformers from the network circuit or grid.

The fault on the feeder circuit 3 also results in a tripping of the feeder circuit breaker 3a. If the feeder circuit breaker 3a is of the automatic reclosing type, it immediately enters its reclosing cycle. Should the fault on the feeder circuit 3a clear before the completion of the reclosing cycle, the feeder circuit breaker 3a recloses and remains closed. The closure of the feeder circuit breaker places the network transformers 7 and 12 in condition to supply electric energy to the network circuit or grid 1. If the associated network protectors are of the manual reclosing type, a manual reclosure of each of these network protectors restores the entire system to its normal condition. If the network protectors 7a and 12a are of the automatic reclosing type, they reclose automatically to restore the entire system to its normal condition.

However, if the fault occurring on the feeder circuit 3 is of permanent nature, or if the feeder circuit breaker 3a is of the manually reclosing type, the feeder circuit breaker remains in its open condition. If the switches 7b and 12b are automatic in operation, they then transfer to their emergency connection, thereby connecting their associated transformers to the feeder circuit 2. In the event the circuit breaker 3a is of the automatic reclosing type, preferably this operation of the switches is accompanied by a time delay in order to permit the circuit breaker to go through its reclosing cycle.

If the switches 7b and 12b are of the manually operable type, an attendant operates these switches to connect the associated transformers to the sound feeder circuit 2. Such operation of the circuits restores all of the network transformers to service, and eliminates the requirement for reserve or spare capacity thereof. Since a transformer generally has a high overload capacity for short periods, the transformers 9 and 10 are capable of carrying the network circuit or grid load until the switches 7b and 12b are operated.

After the feeder circuit 3 has been repaired, the switches 7b and 12b may be manually restored to the positions illustrated in Fig. 1. The system then may be placed in condition for its normal operation.

In Fig. 2, the load bus 7c and the equipment associated therewith are illustrated in greater detail. Conveniently, the transformer 7 may have a delta-connected primary winding and a star-connected, grounded-neutral secondary winding. However, other suitable connections thereof may be employed. Fuses F may be provided between the transformer and the network circuit. These fuses "blow" only if subjected to excessive current for a time sufficient to permit prior operation of the associated protector or the network circuit limiters 17.

As a specific example, the fuses may have a minimum "blowing" current equal to about two times the current rating of the associated network protector, or equal to about three to three-and-one-half times the current rating of the associated network transformer. These fuses not only may be employed to disconnect the associated network transformer from the bus 7c when a fault occurs on the bus 7c, but also may be relied on to back up the network protector in controlling the connection of the network transformer to the bus.

The network protector 7a includes a network circuit breaker 30 having a closing motor or solenoid 31. The network circuit breaker 30 is held in closed position by means of a tripping latch 32 which is operated by a tripping solenoid 33.

The tripping of the network circuit breaker 30 is controlled by a directional master relay 34 having a movable contact 35 which may be actuated into engagement with either a pair of tripping contacts 36 or a pair of closing contacts 37. Engagement of the movable contact 35 with the tripping contacts 36 completes a tripping circuit for the tripping solenoid 33 which may be traced from a phase conductor C of the associated polyphase circuit through a conductor 40, front contacts of a pallet switch 41 on the circuit breaker 30, a conductor 42, the energizing coil of the tripping solenoid 33, the tripping contacts 36, a conductor 43 and a conductor 132 to a second phase conductor B of the associated circuit.

The design of the master relay 34 is well known in the art. For example, suitable constructions for the master relay are shown in my Patents Nos. 1,973,097 and 2,013,836.

Although the network circuit breaker 30 may be manually reclosed, preferably it is automatically reclosed when the conditions across its poles are such that energy will flow from the associated feeder circuit to the network circuit or grid. For controlling the closure of the network circuit breaker, a phasing relay 50 may be employed in addition to the master relay 34. A suitable construction for the phasing relay 50 is shown in greater detail in my Patents Nos. 1,997,697 and 2,082,024.

If the network circuit breaker 30 is in open condition and if the conditions across its poles are such that electric energy will be supplied from the associated feeder circuit to the network circuit or grid, a closing circuit for the network circuit breaker is set up by operation of a closing relay 54. An energizing circuit for the closing relay 54 may be traced from the phase conductor B through the conductors 132 and 43, a conductor 51, the closing contacts 37 of the master relay, the contacts of the phasing relay, a conductor 50a, back contacts of a pallet switch 52 on the circuit breaker 30, a conductor 53, the energizing winding of the closing relay 54 and a conductor 134 to the phase conductor C. Upon completion of this circuit, the closing relay 54 picks up to close its front contacts.

Closure of the front contacts of the closing relay 54 completes a circuit for the closing motor or solenoid 31 which may be traced from the phase conductor B through the conductors 132 and 43, the energizing winding of the motor or solenoid 31, a conductor 56, contacts 54a of the closing relay 54, and the conductor 134 to the phase conductor C. Completion of this circuit results in the closure of the circuit breaker 30.

It should be noted that closure of front contacts 54b of the closing relay 54 establishes a holding circuit for the closing relay. This holding circuit may be traced from the phase conductor C through the conductor 134, the energizing winding of the closing relay 54, the back contacts of the pallet switch 52, the conductor 50a, the contacts 54b of the closing relay 54, and the conductor 43 to the phase conductor B. During the final portion of the closing movement of the circuit breaker 30, the pallet switch 52 opens to deenergize the closing relay 54, which in turn opens the energizing circuit of the closing solenoid 31.

Referring to Fig. 2, a switch 7b is disclosed. This switch 7b includes an arm 100 formed of insulating material and carrying three contacts 101 which are connected respectively to the primary terminals of the transformer 7. The arm 100 is attached to a drum 102 which is rotatable about a shaft 103. A suitable handle 104 may be attached to the drum for rotating the drum and the arm 100 about the shaft 103. Operation of the handle 104 serves to move the contacts 101 carried by the arm 100 from their open positions illustrated in Fig. 2 into engagement with a set of contacts 2d or 3d.

In order to interlock the switch 7b against movement while carrying substantial current, the drum 102 may be provided with three notches 105, 106 and 107. A pin 108 is positioned to enter one of the notches to prevent rotation of the drum 102. The pin 108 is mounted for reciprocation in a vertical direction, as viewed in Fig. 2. A spring 109 is provided for biasing the pin 108 away from the drum 102.

Actuation of the pin 108 towards the drum 102 is effected by a pair of solenoids 110 and 111. Proper energization of either or both of the solenoids actuates the pin 108 against the bias of the spring 109 into one of the notches 105, 106 or 107. In Fig. 2, the circuit breaker 30 is employed for connecting the secondary of the transformer 7 to the network circuit or grid 1.

As previously explained, it is desirable that operation of the switch 7b be permitted only when the circuit breaker 30 is in open condition. To this end, the circuit breaker 30 is provided with a pallet switch 131 having front contacts. When the circuit breaker 30 is in closed condition, the pallet switch 131 completes an energizing circuit for the winding of the solenoid 111. This energizing circuit may be traced from the phase conductor B through the conductor 132, the winding of the solenoid 111, a conductor 133, the pallet switch 131 and the conductor 134 to the phase conductor C. Consequently, when the circuit breaker 30 is in closed condition, the solenoid 111 is energized to urge the pin 108 into one of the notches 105, 106 or 107, thereby preventing actuation of the switch 7b.

When the circuit breaker 30 opens, the energizing circuit for the solenoid 111 is interrupted at the pallet switch 131. Consequently, the spring 109 urges the pin 108 out of its interlocking engagement with the drum 102 and permits operation of the switch 7b.

If it is desired to lock the switch 7b in its neutral position, the pin 108 may be manually inserted in the slot 106, and a latch 106a may be manually actuated to a position beneath the solenoid 111 to hold the pin 108 in locking position. At other times, the latch 106a is in retracted position as illustrated in Fig. 2.

Since a fault occurring near the circuit breaker 30 may drop the voltage applied to the solenoid 111 sufficiently to permit the spring 109 to withdraw the pin 108 from its interlocking engagement with the drum 102, it may be desirable to provide an additional control for the pin 108. To this end, the circuit breaker 30 may have a second pallet switch 135 which also has front contacts. Closure of the pallet switch 135 completes an energizing circuit from a current transformer 136 associated with the phase conductor C to the solenoid 110. The energization of the solenoid 110 is designed to maintain the pin 108 in its interlocking engagement with the drum 102 against the bias of the spring 109 when the circuit breaker 30 is closed and substantial current flows through the primary of the current transformer 136.

It should be observed that operation of the switch 7b is permitted only when the switch carries substantially no current. For this reason, the switch may be designed with interrupting capacity only sufficient for the magnetizing current of the transformer 7. If an auxiliary source of energy, such as a battery 112 (see Fig. 2A) is available, only one of the solenoids 110 or 111 need be employed. Such a solenoid 110 may be connected to the battery through one of the pallet switches 131 or 135, such as the pallet switch 135 of Fig. 2A.

Although connecting circuits could be provided which extend directly between the load buses 8c and 11c in Fig. 1, such connecting circuits preferably are not employed. The omission of these connecting circuits results in a network or distribution circuit 1 which is essentially a loop circuit. Such a loop circuit provides a somewhat more uniform load distribution among the various transformers during the period immediately following the removal from service of one of the feeder circuits. In addition, the provision of a loop circuit similar to that illustrated in Fig. 1 restricts the flow of short-circuit current to a fault occurring at any point on the loop circuit to a reasonable maximum value. If it is found desirable to restrict further the short-circuit current, a plurality of independent loop circuits may be employed, each energized from network transformers having capacities lower than those which would be required for a single loop circuit.

If the network protectors are located adjacent their respective load buses, a single circuit may be employed between each network protector and its associated load bus. Should the network protectors be located at a substantial distance from their respective load buses, a plurality of circuits may be employed between each network protector and its associated load bus. Such a connection is illustrated in Fig. 1. For example, the network protector 7a is connected to its load bus 7c through three circuits 150. Each of the circuits 150 is independent of the other circuits and has at each end protective devices, such as the limiters 17. With such an arrangement, a fault occurring on one of the circuits 150 results in the blowing of the limiters associated only with the faulty circuit. Consequently, the network protector remains connected to its associated load bus 7c through the remaining two sound circuits 150.

The number of transformers employed for the electrical distribution system of Fig. 1 should be sufficient to carry the maximum system load. Preferably, all transformers are of the same type and rating. In some circumstances, it may be convenient to employ transformers differing in size. Preferably, the number of transformers selected should be greater by one than the number required to carry the maximum system load. This permits the removal of any transformer for servicing without overloading the transformers remaining in service.

The capacity of the load buses and of the connecting circuits forming the network or distribution circuit 1 should be sufficient to carry the rated load current of any transformer in either direction away from the transformer. This assures sufficient capacity in the loop to energize any of the load immediately following the removal from service of one of the feeder circuits.

The limiters 17 may vary in rating. As a specific example, the minimum fusing current of a limiter may be about three to three-and-one-half times the 1940 National Electric Code rating of the cable with which it is designed to be employed. This value assures a sufficiently low temperature of the limiter terminals to permit the associated cable to carry safely its full rated current.

Detection of a faulty connecting circuit is readily made. For example, the limiters 17 may be of the type which provide an indication that they have blown. If the current limiters are of this type, a rapid inspection of the limiters indicates those which have blown. However, indicating current limiters are not essential.

Inspection of the connecting circuits may be effected by applying to each connecting circuit in turn a clip-on or tong-type ammeter. If the ammeter indicates that the connecting circuit is carrying current, the connecting circuit clearly is in sound condition.

Under certain conditions, no current may flow through a sound connecting circuit. To guard against such a contingency, a network protector adjacent such a connecting circuit should be tripped. If the ammeter fails to indicate that the connecting circuit carries current after the network protector is tripped, the connecting circuit requires servicing. As previously pointed out, a fault on one of the feeder circuits in Fig. 1 results in the removal from service of the network transformers associated with the faulty feeder circuit. If the network transformers associated with the faulty feeder circuit are not transferred to the sound feeder circuit within a reasonable time, such as one hour, the network transformers associated with the sound feeder circuit may be damaged. To prevent damage to a network transformer under these conditions, each network transformer may be provided with a suitable protective device. This device may take the form of a replica relay which has a time delay in operation dependent on the magnitude of the current energizing the relay, and which is energized in accordance with load current passing through the associated transformer. The relay time-delay for any energizing current is substantially equal to the time during which the associated transformer may safely carry the corresponding transformer load current.

Referring to Fig. 2, a replica protective device is illustrated which may take the form of a bimetallic thermal element 152 designed to be heated by current flowing therethrough. The bimetallic thermal element is fixed at one end to a stationary support. Heating of the thermal element operates to deflect the free end thereof against the tripping latch 32 to trip the circuit breaker 30. This bimetallic thermal element may be included in the circuit of the secondary winding of the current transformer 136. By suitably lagging the bimetallic thermal element 152, the thermal element may be designed to trip the circuit breaker 30 when the network transformer 7 has been loaded excessively for such a period that further operation thereof would result in damage thereto.

Although the master relay 34 employed for tripping the circuit breaker 30 may be of any conventional form, preferably the master relay is designed for insensitive operation at least for a substantial period. The expression "insensitive operation" indicates that the master relay does not respond, at least for a substantial time, to the flow of currents of the order of transformer magnetizing currents from the network or distribution circuit 1 to the distribution transformer 7. A relay designed for insensitive operation is illustrated in Fig. 3.

Referring to Fig. 3, a circuit breaker 130 is illustrated which corresponds to the circuit breaker 30 of Fig. 2. This circuit breaker is controlled by a master relay 154 which corresponds to the master relay 34 of Fig. 2. The master relay 154 includes conventional current windings 156a, 156b and 156c. These current windings are energized respectively from current transformers 158a, 158b and 158c in accordance with currents traversing the phase conductors A, B and C. The master relay 154 also includes voltage windings 160a, 160b and 160c. These voltage windings are energized respectively in accordance with phase-to-ground voltages of the phase conductors A, B and C.

If the master relay 154 is designed for phasing control, it includes phasing winding 162a, 162b and 162c, each of which has one terminal connected respectively to the phase conductors A, B and C on the network or distribution circuit side of the circuit breaker 130. The remaining terminals of the phasing windings 162a, 162b and 162c are connected through suitable phasing impedances (not shown), respectively, to the phase conductors A, B and C in the transformer side of the circuit breaker 130. The construction and operation of the master relay 154 thus described is well understood in the art.

The master relay 154 has power directional characteristics. The master relay 154 has a movable contact 164 which corresponds to the contact 35 of Fig. 2. This movable contact 164 may be actuated into engagement with a tripping contact 166, or with a closing contact 168, which correspond respectively to the contacts 36 and 37 of Fig. 2. When current flows from the network transformer 7 to the network or distribution circuit, the movable contact 164 is urged away from the tripping contact 166. When current flows from the network or distribution circuit to the network transformer 7, the movable contact 164 is urged into engagement with the tripping contact 166. The master relay 154 is sufficiently sensitive to respond to currents of the order of transformer magnetizing currents flowing to the network transformer 7.

To prevent an instantaneous tripping operation in response to currents of the order of transformer magnetizing currents, a timing mechanism is provided which includes a timing bimetallic element 170 having a heater 172 and an auxiliary control relay 174. The bimetallic element 170 has one end fixed to a stationary support. The remaining end is actuable between "cold" contacts 182 and "hot" contacts 186 in response to changes in temperature of the bimetallic element. When the movable contact 164 of the master relay engages the tripping contact 166, an energizing circuit is completed for the winding of the auxiliary control relay 174 which may be traced from the phase conductor A, through a conductor 176, the contacts 164 and 166, a conductor 178, a conductor 180, the "cold" contacts 182 associated with the bimetallic element 170, the energizing winding of the auxiliary control relay 174, and a conductor 184 to the phase conductor C. Consequently, the auxiliary control relay 174 closes its front contacts to maintain an energizing circuit for the heater 172. It will be observed that the heater 172 is in parallel with the energizing winding of the auxiliary control relay 174.

As the bimetallic element 170 heats, it moves away from the "cold" contacts 182 into engagement with a pair of "hot" contacts 186. Closure of the "hot" contacts completes a tripping circuit for the circuit breaker 130. This tripping circuit may be traced from the phase conductor A through the conductor 176, the contacts 164 and 166, the conductor 178, the contacts of the auxiliary control relay 174, the "hot" contacts 186, the energizing winding of the tripping solenoid 33, the pallet switch 41, a conductor 188, and the conductor 184 to the phase conductor C.

If the contacts 164 and 166 of the master relay 154 separate before the bimetallic element 170 engages its "hot" contacts 186, the auxiliary control relay 174 opens its contacts to deenergize the heater 172. Consequently, a successive tripping operation cannot be initiated until the bimetallic element 170 has cooled sufficiently to reclose its "cold" contacts 182. The bimetallic element may be designed to introduce a time delay of the order of one minute between closure of the contacts 164 and 166 of the master relay and a tripping operation of the circuit breaker 130.

Should a fault occur on the feeder circuit associated with the network transformer 7, it is desirable that the circuit breaker 130 trip promptly. For this purpose, a plurality of phase relays 190a, 190b and 190c are provided which are energized respectively from the current transformers 158a, 158b and 158c in accordance with currents flowing through the phase conductors A, B and C. The contacts of each of these relays are connected directly between the tripping contact 166 of the master relay and the energizing winding of the tripping solenoid 33. The relays 190a, 190b and 190c are designed to close their contacts when currents flow through their respective phase conductors A, B and C which have values substantially greater than the value of the transformer magnetizing currents.

Consequently, in response to a flow of transformer magnetizing current from the network circuit to the transformer 7, the contacts of the phase relays 190a, 190b and 190c remain open, and the circuit breaker 130 trips only if the transformer magnetizing current continue to flow for at least a substantial time, such as one minute.

If a fault occurs on the associated feeder circuit, current flowing through at least one of the phase conductors is sufficient to cause the associated phase relay to close its contacts and permit a prompt tripping of the associated circuit breaker 130.

Since the contacts 164 and 166 of the master relay remain separated when current flows from the network transformer 7 to the network distribution circuit, it follows that the circuit breaker 130 does not trip for such a flow of current.

Fig. 3 also illustrates a modified form of load capacity protection for the network transformer 7. The network transformer 7 may vary substantially in construction;—it may be of the gas- or air-cooled type, or it may be immersed in some liquid insulating fluid, such as oil. To provide load capacity protection, a bimetallic element 192a may be connected in the circuit of the secondary winding of the current transformer 158a for energization in accordance with current flowing in the phase conductor A. In response to an increase in temperature thereof, the bimetallic element 192a closes its contacts 194 and 196 to complete a tripping circuit for the circuit breaker 139. This tripping circuit may be traced from the phase conductor A, through a conductor 198, the contacts 194 and 196, a conductor 200, the energizing winding of the tripping solenoid 33, the pallet switch 41, and the conductors 188 and 184 to the phase conductor C.

By placing the bimetallic element 192a in the insulating fluid of the transformer 7, the bimetallic element is heated not only by current flowing therethrough, but by the insulating fluid. By proper proportioning of the bimetallic element, the bimetallic element may be designed to close its contacts only when further operation of the network transformer 7 would result in damage thereto. A protective device of the type represented by the bimetallic element 192a is disclosed in the Hodnette patent No. 2,066,935.

Similar bimetallic elements 192b and 192c, having their contacts in parallel with the contacts 194 and 196 of the bimetallic element 192a, may be provided for energization respectively in accordance with the currents flowing in the phase conductors B and C. The bimetallic elements 192a, 192b and 192c may be positioned directly in the insulating medium of the network transformer 7 within the transformer casing T represented in broken lines.

A tripping control for a network protector similar to that illustrated in Fig. 3 is disclosed in greater detail in the Edson Patent No. 2,112,081.

A peculiar problem is presented by a fault occurring in one of the network transformers. Referring to Fig. 1, let it be assumed that a fault occurs in the network transformer 7. In response to this fault, the network protectors associated with the feeder circuit 3 trip to disconnect their associated transformers 7 and 12 from the network circuit 1. In addition, the feeder circuit breaker 3a trips to complete the deenergization of the feeder circuit 3. However, it should be observed that the conditions of the feeder circuit breaker and network protectors associated with the feeder circuit 3 do not indicate that the fault occurs in one of the network transformers instead of on the feeder circuit 3.

Should an attendant switch the network transformers 7 and 12 to the remaining feeder circuit 2, fault current would flow from the feeder circuit 2 to the fault in the network transformer 7. This would result in the tripping of the feeder circuit breaker 2a and a loss of the entire system load. To prevent such a loss of load, it is desirable that the following switching sequence be employed.

Let it be assumed that the network protectors have an insensitive tripping control of the type illustrated in Fig. 3. When a fault occurs resulting in the tripping of the feeder circuit breaker 3a and the network protectors 7a and 12a, the switch 7b should be placed in its neutral or "disconnect" position. After placing the switch 7b in its neutral position, the network protector 7a should be closed. If the fault resulting in the deenergization of the feeder circuit 3 occurred on the feeder circuit, the network protector 7a will remain closed for a substantial time depending upon the setting of the timing bimetallic element 170 (Fig. 3). This is for the reason that the network protector merely supplies transformer magnetizing current to the network transformer 7. If the network protector 7a remains closed for a substantial time such as ten seconds, the associated network transformer 7 is in sound condition and may be transferred to the remaining feeder circuit 2 by operation of the associated switch 7b. The same procedure should then be followed for the network transformer 12.

Should the fault resulting in the deenergization of the feeder circuit 3 be located in the network transformer 7, the closure of the network protector 7a results in the flow of substantial fault current from the network circuit 1 to the network transformer 7. Consequently, the network protector 7a trips promptly to indicate the presence of a fault in the network transformer 7. In this case, the switch 7b should be left in its neutral position and the feeder circuit breaker should be reclosed to supply electrical energy to the sound network transformer 12. The electrical distribution system then continues in full operation except for the deenergization of the single faulty network transformer 7. This network transformer may be serviced or replaced without disturbance to the remainder of the electrical distribution system. By following the same procedure for each network transformer associated with a deenergized feeder circuit, either a faulty network transformer is located or the fault resulting in the deenergization of the feeder circuit is shown to be present on the feeder circuit itself.

In the event that a fault occurs on one of the connecting circuits such as the connecting circuit 13, repairs may be effected safely by an experienced service man without deenergizing any portion of the electrical distribution system. In order to provide maximum safety, however, a pair of switches 202 and 204 preferably of the load-break type may be associated with each of the load buses. These load-break switches divide each of the load buses into a central load section and two terminal sections. For example, the load-break switches divide the load bus 7c into a central load section 206 and two terminal sections 208 and 210. By inspection of Fig. 1, it will be observed that each pair of connecting circuits is connected to a separate terminal section of one of the associated load buses. Consequently, by operation of two load-break switches, it is possible to deenergize all of the connecting circuits between any pair of load buses. These load-break switches may be of the manually tripped and manually closed type, and are designed to open load currents. Normally these load-break switches are all closed.

The load-break switches may be placed in the enclosure E. If desired the enclosure E may be divided to provide a central section Ea housing the load section 206 of the load bus together with the associated limiters 17 and circuit breakers 19. The enclosure E may then have two end sections Eb each enclosing a terminal section 208 or 210 of the load bus and associated limiters 17.

If the load-break switches 202 and 204 are automatically tripped in response to overcurrent, it may be possible in some cases to omit the limiters 17 in the connecting circuits. Preferably, however, the limiters 17 are provided and the load-break switches are manually tripped, as above set forth, to provide optimum performance.

As a specific example, let it be assumed that the connecting circuit 13 requires servicing. To deenergize the portion of the system to be serviced, the load-break switch 204 associated with the load bus 7c and the load-break switch 202 associated with the load bus 8c are manually tripped. The tripping of these two switches deenergizes the connecting circuits 13 and 14 together with their associated terminal sections of the load buses without disturbing the remainder of the distribution system. After completion of the servicing operations, the load-break switches at each end of the connecting circuits 13 and 14 may be reclosed to restore the entire system to its normal condition of operation.

The load-break switches also facilitate the deenergization of the load section of a load bus. For this purpose the two load-break switches 202 and 204 together with the network protector associated with a load bus may be opened.

Although Fig. 1 discloses only two feeder circuits and only two connecting circuits between each pair of load buses, it will be understood from the foregoing discussion that as many feeder circuits and as many connecting circuits as desired may be employed. For example, in Fig. 4 three feeder circuits are disclosed for energizing a network or distribution circuit 212 and three connecting circuits are illustrated extending between each pair of load buses.

Figure 4:
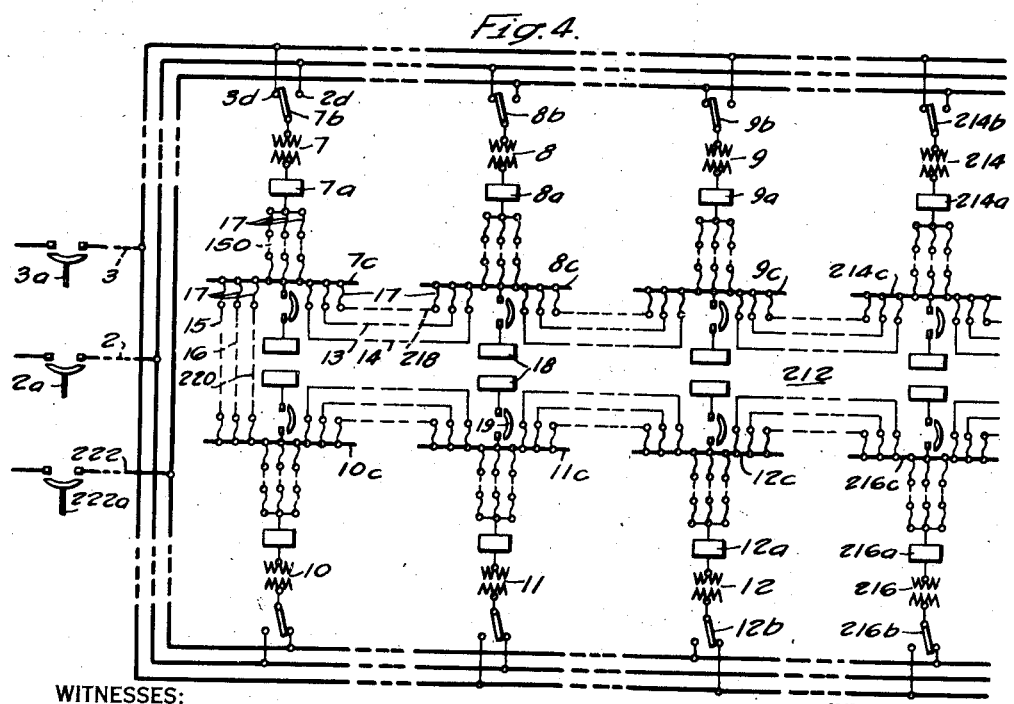
Figs. 4 and 5 are schematic views in single line of modifications of the system illustrated in Fig. 1.

Referring to Fig. 4, several feeder circuits including the feeder circuits 2 and 3, and a third feeder circuit 222 are illustrated as supplying electrical energy to six load buses 7c and 12c. These load buses correspond to the load buses 7c to 12c of Fig. 1. Although load-break switches 202 and 204 could be employed in each of the load buses of Fig. 4, for simplicity such load-break switches have been omitted. It will be understood that when these load-break switches are omitted, the connecting circuits may be serviced while they are in an energized condition. By inspection of Fig. 4, it will be observed that the network circuit 212 of Fig. 4 is energized through the network transformers 7 to 12, their associated double-throw switches 7b to 12b and their associated network protectors 7a to 12a.

The network circuit 212 is substantially larger than that illustrated in Fig. 1 and includes a number of additional load buses which include the load buses 214C and 216C. Each of these load buses is energized through a network transformer 214 or 216, a double-throw switch 214b or 216b, and a network protector 214a or 216a. These elements correspond to the network transformer 7, the double-throw switch 7b and the network protector 7a.

As shown in Fig. 4, each pair of load buses is connected by three connecting circuits. For example, the load buses 7C and 8C are connected, not only by the connecting circuits 13 and 14, but by a third connecting circuit 218. Similarly, the two load buses 7C and 10C are connected, not only by the connecting circuits 15 and 16, but by a similar connecting circuit 220. It will be understood that all of the connecting circuits are similar and each circuit is provided at each end with limiters 17. Each of the connecting circuits, as previously stated, preferably is segregated in a separate duct. This prevents a fault occurring on one of the connecting circuits from affecting others of the connecting circuits. Consequently, such a fault would result in the blowing of the limiters associated wtih the ends of only one of the connecting circuits and would leave the associated load buses connected through the remaining connecting circuits.

In the modification illustrated in Fig. 4, a third feeder circuit 222 is disclosed which is similar to the feeder circuits 2 and 3. This feeder circuit 222 may include a feeder circuit breaker 222a which is similar to the feeder circuit breakers 2a and 3a.

The network transformers conveniently may be spaced in accordance with the spacing and density of the loads associated with the load buses. If the load density is reasonably uniform the network transformers preferably are spaced apart by equal distances.

The network transformers are connected to the feeder circuits in a predetermined orderly sequence. For example, in Fig. 4 every third transformer normally is connected to the feeder circuit 3. The network transformer 7, the network transformer 12 and the network transformer 214 all are normally connected to the feeder circuit 3. The next transformer in each group of three is connected to the feeder circuit 2. In Fig. 4 the transformers 8 and 11 normally are connected to the feeder circuit 2. The remaining network transformers of each group of three normally are connected to the feeder circuit 222. With such an orderly sequence of connections, a uniform load distribution is obtained.

Should it become necessary to transfer the network transformers normally associated with a feeder circuit to their emergency connections, it is desirable that these network transformers be divided in a uniform manner between the two feeder circuits remaining in service. For this reason the network transformer 7 which is normally connected to the feeder circuit 3 may have an emergency connection to the feeder circuit 2. The next network transformer 214 which is normally connected to the feeder circuit 3 has an emergency connection to the feeder circuit 222. In this manner, the network transformers normally associated with the feeder circuit 3 have emergency connections which alternate about the loop between the feeder circuits 2 and 222. Similarly, the network transformers normally connected to the feeder circuit 2 have emergency connections which alternate about the loop circuit between the feeder circuits 3 and 222. Finally, the network transformers which normally are associated with the feeder circuit 222 have emergency connections which alternate between the feeder circuits 2 and 3. These connections assure not only a reasonably uniform load distribution during normal operation of the distribution system, but a reasonably uniform load distribution with any feeder circuit out of service.

As previously explained, a network transformer may be connected to each of the load buses, or one or more additional load buses may be included in the loop circuit between each pair of network transformers. For example, in Fig. 1 the load buses 8c and 11c are located between pairs of network transformers. In the modification illustrated in Fig. 4, each of the load buses is connected to a separate network transformer.

In the system thus far described, a separate load bus is energized directly by each transformer. In some systems it may be desirable to energize a single load bus directly by two or more transformers.

Figure 5:
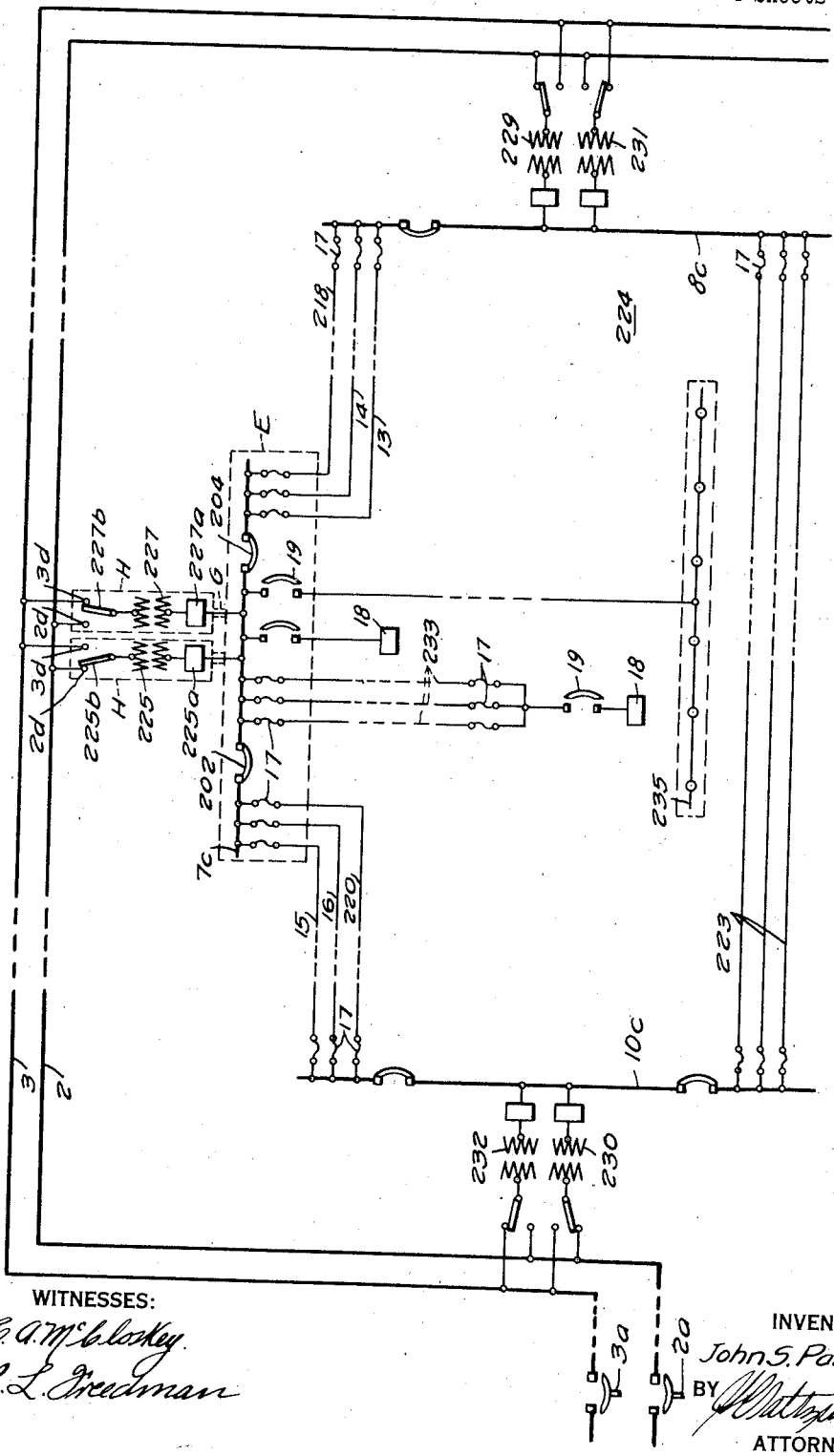

Referring to Fig. 5, it will be observed that a secondary network circuit 224 is provided in the form of a loop circuit comprising the three load buses 7c, 8c and 10c and three connecting circuits between each pair of load buses. In Fig. 5, the load buses 7c and 8c are connected by the three connecting circuits 13, 14 and 218 which are connected to one terminal section of each load bus.

The load buses 7c and 10c have the three connecting circuits 15, 16 and 220. Similarly three connecting circuits 223 connect the load buses 10c and 8c. As previously explained each connecting circuit may be a three phase circuit enclosed in a separate duct, and having limiters 17 at each end. The load bus 7c is energized from the feeder circuits 2 and 3 through two transformers 225 and 227. The primary winding of the transformer 225 is connected normally to the feeder circuit 2, through a switch 225b which is similar to switch 7b of Fig. 1. Similarly, the primary winding of the transformer 227 is connected normally to the feeder circuit 3 through a switch 227b. The transformers 225 and 227 have emergency connections through the switches 225b and 227b respectively to the feeder circuits 3 and 2. Each of the transformers 225 and 227 may have half the rated load capacity of the single transformer 7 which otherwise would be associated with the load bus.

Each of the transformers 225 and 227 has its secondary winding connected to the load bus 7c through a protector 225a or 227a which corresponds to the protector 7a of Fig. 1. Each transformer 225 or 227, its switch 225b or 227b and its protector 225a or 227a correspond to the transformer 7, switch 7b and protector 7a, and operate in the same manner.

The enclosures E and H are illustrated in dotted lines in Fig. 5. If desired each bus connecting the protectors 225a and 227a to the load bus may be provided with a suitable enclosure or duct G to complete the enclosure of all apparatus associated with the load bus.

In a similar manner, pairs of additional transformers may be associated with the other load buses 8c and 10c of the network circuit 1. For example, a pair of transformers 229 and 231 are similarly associated with the load bus 8c. Also a pair of transformers 230 and 232 are similarly associated with the load bus 10c. Although only three load buses are illustrated in Fig. 5, as previously pointed out the number of load buses may be varied to suit each installation.

One of the advantages derived from the system of Fig. 5 is that removal from service of one of the transformers, such as the transformer 225, does not interrupt, even temporarily, the direct supply of electrical energy to the associated load bus 7c. Electrical energy continues to be supplied to the load bus 7c through the transformer 227. For this reason, loss of a transformer or a feeder circuit results in the transfer of substantially less load to adjacent transformers of the system of Fig. 5 than that transferred in the system of Fig. 1 under similar circumstances. The reduced transfer of load in turn permits a substantial reduction in the rated load capacity of the parts of the secondary network circuit, such as the connecting circuits. In addition the regulation of the system is somewhat improved during the period required to restore all transformers to service. By connecting the transformers in pairs to the load buses instead of providing separate load buses therefor, a material saving in load breaker switches and limiters is effected.

As pointed out in the discussion of Fig. 1, each of the transformers 7 to 12 may be connected to its load bus through a plurality of circuits 150. A similar connection may be employed for certain or all of the loads 18.

Referring to Fig. 5, a load 18 is shown radially connected to the load bus 7c through the circuit breaker 19 and three circuits 233. Each of these circuits has fuses or limiters 17 at each end. Consequently, a fault on any of the circuits 233 results in the blowing of the limiters associated only with the faulty circuit, and the remaining two circuits continue to supply electrical energy to the load 18.

Loads may be energized from the load buses in various ways. As a further example a bus duct 235 is connected to the load bus 7c in Fig. 5 through one of the circuit breakers 19. As well understood in the art a bus duct is a distributed bus structure having provisions for connecting loads thereto at spaced intervals. An example of such a bus duct is shown in greater detail in the Gerlach et al. Patent 1,965,181. Although no loads are shown connected to the buses 8c and 10c in Fig. 5, it will be understood that loads may be connected thereto in the manner discussed with reference to the load bus 7c.

Although the invention has been described with reference to certain specific embodiments thereof, numerous modifications thereof are possible. Therefore, the invention is to be restricted only by the appended claims as interpreted in view of the prior art.

I claim as my invention:

1. In an electrical distribution system, a plurality of buses each having a first section and second sections, a plurality of circuits connecting said buses for forming therewith a loop circuit, said circuits being connected to the second sections of said buses, means for supplying electrical energy to said loop circuit at the first sections of said buses, and means associated with said buses for disconnecting the second sections from the first sections thereof, whereby the associated connecting circuits can be disconnected from the first sections of said buses.

2. In an electrical distribution system, a plurality of buses, a plurality of circuits connecting each pair of said buses for forming therewith a loop circuit, protective means at each end of each of said connecting circuits for disconnecting each connecting circuit from its associated pair of buses, means for supplying electrical energy to said loop circuit at said buses, and means associated with each of said buses for disconnecting therefrom simultaneously all of the associated connecting circuits extending to another of said buses.

3. In an electrical distribution system, a plurality of buses each having a first section and a pair of second sections, interrupting means for interrupting the connection between each of said second sections and the associated first section, a group of circuits connecting each pair of said buses, each of said groups of connecting circuits being connected to a separate one of the second sections of the associated buses, and means for supplying electrical energy to a plurality of said buses.

4. In an electrical distribution system, a plurality of buses each having a first section and a pair of second sections, interrupting means for interrupting the connection between each of said second sections and the associated first section, a group of circuits connecting each pair of said buses to form therewith a loop circuit, each of said groups of connecting circuits being connected to a separate one of the second sections of the associated buses, electrical loads associated with the first sections of said buses for energization therefrom, a plurality of sources of electrical energy, and means connecting each of said sources to certain of said load buses, said sources being connected to the first sections of said buses.

5. In an electrical distribution system, a plurality of buses each having a load section and a pair of terminal sections, a separate load-break switch for connecting each of said terminal sections to its associated load section, a group of connecting circuits extending between each pair of said buses to form therewith a loop circuit, each end of each of said groups of connecting circuits being connected to a separate terminal section of the associated buses, whereby each of said groups of connecting circuits may be disconnected from the remainder of said loop circuit by operation of a pair of said load-break switches, current responsive disconnecting means at each end of each of said connecting circuits for disconnecting a faulty connecting circuit from its associated buses, a plurality of sources of electrical energy, and means connecting each of said sources of electrical energy to the load sections of certain of said buses.

6. In an electrical distribution system, a distribution circuit, a plurality of sources of electrical energy, a plurality of transformers for connecting said sources of electrical energy to said distribution circuit, means for transferring each of said transformers from one of said sources of electrical energy to another of said sources of electrical energy, a circuit breaker for controlling the connection of each of said transformers to said distribution circuit, and means responsive substantially to a value of load only in excess of the load capacity of each of said transformers for tripping the associated circuit breaker.

7. In an alternating current electrical distribution system, a secondary loop circuit, a plurality of sources of electrical energy, a plurality of transformers for connecting said sources of electrical energy to said loop circuit, means for selectively coupling the primary winding of each of said transformers to either of a pair of said sources of electrical energy, a circuit breaker for controlling the connection of each of said transformers to said loop circuit, means responsive to the direction of power flow through each of said transformers for tripping the associated circuit breaker, and means responsive substantially to a value of load only in excess of the load capacity of each of said transformers to tripping the associated circuit breaker.

8. The method of switching from a first source of electrical energy to a second source of energy the primary windings of transformers each having a secondary winding connected to a common distribution circuit through a directionally-controlled circuit breaker at least temporarily insensitive to transformer magnetizing current; which method comprises, disconnecting the primary winding of a first transformer from said first source of energy, closing the circuit breaker associated with said first transformer, and connecting said first transformer to said second source of energy only if said circuit breaker remains closed for a substantial time.

9. The method of operating a distribution system having a first source of energy and a second source of energy each connected to a common distribution circuit respectively through first and second transformers and through first and second directionally-controlled circuit breakers insensitive for at least a substantial time to transformer magnetizing circuit; which comprises, disconnecting said first source of energy from its associated first transformer, closing the first circuit breaker connecting said first transformer to said common distribution circuit to determine whether or not said associated transformer is in proper operating condition, and connecting said first transformer to said second source of energy only if its associated first circuit breaker remains closed for a time sufficient to indicate that the first transformer is in proper operating condition.

10. In an electrical distribution system, a distribution circuit, a plurality of sources of electrical energy, means for connecting said distribution circuit to said sources of electrical energy, said connecting means comprising a transformer, switch means operable for selectively connecting said transformer to either of a pair of said sources of electrical energy for energization therefrom, said switch means also being operable to disconnect said transformer from said sources, a circuit breaker connecting said transformer to said distribution circuit, and means responsive to the direction of power flow through said transformer for tripping said circuit breaker, said tripping means being insensitive, at least temporarily, to transformer magnetizing current.

11. In an electrical distribution system, a loop distribution circuit, a plurality of sources of electrical energy, and a plurality of units for connecting said sources of electrical energy to said loop distribution circuit, each of said units comprising a transformer, switch means operable for selectively connecting the primary winding of said transformer to either of a pair of said sources of electrical energy, said switch means being operable for disconnecting said primary winding from both of said pair of sources, a circuit breaker for connecting the secondary winding of said transformer to said loop distribution circuit, and means responsive to a reversal in the normal direction of power flow through said transformer for tripping said circuit breaker, said tripping means being insensitive at least for a substantial time to tripping current of the magnitude of normal transformer magnetizing current.

12. In an electrical distribution system, a distribution circuit, a plurality of sources of electrical energy, means for connecting said distribution circuit to said sources of electrical energy, said connecting means comprising a transformer, switch means operable for selectively connecting said transformer to either of a pair of said sources of electrical energy for energization therefrom, said switch means also being operable to disconnect said transformer from said sources, a circuit breaker connecting said transformer to said distribution circuit, means responsive to the direction of power flow through said transformer for tripping said circuit breaker, said tripping means being insensitive, at least temporarily, to currents below a predetermined value including transformer magnetizing current, and means permitting operation of said switch means only when said switch means carries substantially less than its normal load current.

13. In an electrical distribution system, a loop distribution circuit, a plurality of sources of electrical energy, and a plurality of units for connecting said sources of electrical energy to said loop circuit, each of said units comprising a transformer, switch means operable for selectively connecting the primary winding of said transformer to either of a pair of said sources of electrical energy, said switch means being operable for disconnecting said primary winding from both of said pair of sources, a circuit breaker for connecting the secondary winding of said transformer to said loop distribution circuit, means responsive to a reversal in the normal direction of power flow through said transformer for tripping said circuit breaker, said tripping means being insensitive at least for a substantial time to tripping current of the magnitude of normal transformer magnetizing current, and said tripping means being sensitive substantially instantaneously to larger tripping currents, means permitting operation of said switch means only when said circuit breaker is in open condition, and means responsive substantially to a value of load only in excess of the load capacity of said transformer for tripping said circuit breaker.

14. In an electrical distribution system, a distribution circuit, a plurality of sources of electrical energy, and means for connecting said sources of electrical energy to said distribution circuit, said means comprising a plurality of transformers for connecting a substantially common point on said distribution circuit to said sources of electrical energy, and means operable for selectively connecting each of said transformers to either of a pair of said sources of electrical energy for energization therefrom.

15. In an electrical distribution system, a distribution circuit, a plurality of sources of electrical energy, and means connecting said distribution circuit to said sources of electrical energy, said means comprising a first transformer, a second transformer, means connecting the secondary windings of said transformers to a substantially common point on said distribution circuit, means normally connecting the primary winding of said first transformer to a first one of said sources of electrical energy, said last-named means being operable for transferring said primary winding from said first one to another of said sources of electrical energy, and means normally connecting the primary winding of said second transformer to a second one of said sources of electrical energy, said last-named means being operable for transferring said last-named primary winding from said second one to another of said sources of electrical energy.

16. In an electrical distribution system, a distribution circuit, a plurality of sources of electrical energy, and means connecting said distribution circuit to said sources of electrical energy, said means comprising a first transformer, a second transformer, means connecting the secondary windings of said transformers to a substantially common point on said distribution circuit, said last-named means including separate circuit-interrupting means for controlling the connection of each of said secondary windings to said distribution circuit, means normally connecting the primary winding of said first transformer to a first one of said sources of electrical energy, said last-named means being operable for transferring said primary winding from said first one to another of said sources of electrical energy, and means normally connecting the primary winding of said second transformer to a second one of said sources of electrical energy, said last-named means being operable for transferring said last-named primary winding from said second one to another of said sources of electrical energy.

17. In an electrical distribution system, a distribution circuit, a plurality of sources of electrical energy, and means connecting said distribution circuit to said sources of electrical energy, said means comprising a first transformer, a second transformer, means connecting the secondary windings of said transformers to a substantially common point on said distribution circuit, switch means normally connecting the primary winding of said first transformer to a first one of said sources of electrical energy, said last-named means being operable for transferring said primary winding from said first one to another of said sources of electrical energy, switch means normally connecting the primary winding of said second transformer to a second one of said sources of electrical energy, said last-named means being operable for transferring said last-named primary winding from said second one to another of said sources of electrical energy, and means permitting an operation of each of said switch means only when the switch-means-to-be-operated carries substantially less than its normal rated load current.

18. In an electrical distribution system, a distribution circuit, said distribution circuit comprising a plurality of buses, and a plurality of connecting circuits extending between adjacent pairs of said buses to form therewith a loop distribution circuit, a plurality of sources of electrical energy, and means connecting said distribution circuit to said sources of electrical energy, said means comprising a first transformer, a second transformer, means connecting the secondary windings of said transformers to one of said buses of said distribution circuit, said last-named means including separate circuit-interrupting means for controlling the connection of each of said secondary windings to the associated load bus, switch means normally connecting the primary winding of said first transformer to a first one of said sources of electrical energy, said last-named means being operable for transferring said primary winding from said first one to another of said sources of electrical energy, switch means normally connecting the primary winding of said second transformer to a second one of said sources of electrical energy, said last-named means being operable for transferring said last-named primary winding from said second one to another of said sources of electrical energy, and means permitting an operation of each of said switch means only when the switch-means-to-be-operated carries substantially less than its normal rated load current.

19. In an electrical distribution system, a distribution circuit, said distribution circuit comprising a plurality of buses, and a plurality of connecting circuits extending between adjacent pairs of said buses to form therewith a loop distribution circuit, a plurality of sources of electrical energy, and a plurality of first means connecting said distribution circuit to said sources of electrical energy; each of said means comprising a first transformer, a second transformer, means connecting the secondary windings of said transformers to a separate one of said buses of said distribution circuit, said last-named means including separate circuit-interrupting means for controlling the connection of each of said secondary windings to the associated load bus, switch means normally connecting the primary winding of said first transformer to a first one of said sources of electrical energy, said last-named means being operable for transferring said primary winding from said first one to another of said sources of electrical energy, and switch means normally connecting the primary winding of said second transformer to a second one of said sources of electrical energy, said last-named means being operable for transferring said last-named primary winding from said second one to another of said sources of electrical energy.

20. In an electrical distribution system, a distribution circuit, said distribution circuit comprising a plurality of buses, and a plurality of connecting circuits extending between adjacent pairs of said buses to form therewith a loop distribution circuit, a plurality of sources of electrical energy, and a plurality of first means connecting said distribution circuit to said sources of electrical energy; each of said means comprising a first transformer, a second transformer, means connecting the secondary windings of said transformers to a separate one of said buses of said distribution circuit, said last-named means including separate circuit-interrupting means for controlling the connection of each of said secondary windings to the associated load bus, switch means normally connecting the primary winding of said first transformer to a first one of said sources of electrical energy, said last-named means being operable for transferring said primary winding from said first one to another of said sources of electrical energy, switch means normally connecting the primary winding of said second transformer to a second one of said sources of electrical energy, said last-named means being operable for transferring said last-named primary winding from said second one to another to said sources of electrical energy, and means permitting an operation of each of said switch means only when the switch-means-to-be-operated carries substantially less than its normal rated load current.

21. In an electrical distribution system, a plurality of buses, a plurality of circuits connecting said buses for forming therewith a loop circuit, means for supplying electrical energy to said loop circuit at said buses, said means comprising a plurality of sources of energy, means connecting one of said buses to a first one of said sources of energy, said last-named means being operable for transferring said connection of said one of said buses to another of said sources of energy, and means associated with said buses for disconnecting therefrom the associated connecting circuits.

22. In an electrical distribution system, a plurality of buses each having a first section and a pair of second sections, interrupting means for interrupting the connection between each of said second sections and the associated first section, a group of circuits connecting each pair of said buses to form therewith a loop circuit, each of said groups of connecting circuits being connected to a separate one of the second sections of the associated buses, electrical loads associated with the first sections of said buses for energization therefrom, a plurality of sources of electrical energy, and means connecting each of said sources to certain of said load buses, said sources being connected to the first sections of said buses, said last-named means including switch means connecting a plurality of said buses to said sources of electrical energy, each of said switch means connecting an associated one of said buses to one of said sources, and including means operable for transferring the connection of the associated one of said buses to another of said sources.

23. In an electrical distribution system, a plurality of buses each having a load section and a pair of terminal sections, a separate load-break switch for connecting each of said terminal sections to its associated load section, a group of connecting circuits extending between each pair of said buses to form therewith a loop circuit, each end of each of said groups of connecting circuits being connected to a separate terminal section of the associated buses, whereby each of said groups of connecting circuits may be disconnected from the remainder of said loop circuit by operation of a pair of said load-break switches, current responsive disconnecting means at each end of each of said connecting circuits for disconnecting a faulty connecting circuit from its associated load buses, a plurality of sources of electrical energy, and means connecting each of said sources of electrical energy to the load sections of certain of said buses, said last-named means including switch means operable for selectively connecting each of the associated load sections to either of a pair of said sources of electrical energy.

JOHN S. PARSONS.